HELICOPTER CRASH POSITION INDICATOR

Filed April 17, 1967 — 3 Sheets-Sheet 1

3,553,587

INVENTOR
HAAKON AASS
BY Smart & Biggar
ATTORNEYS.

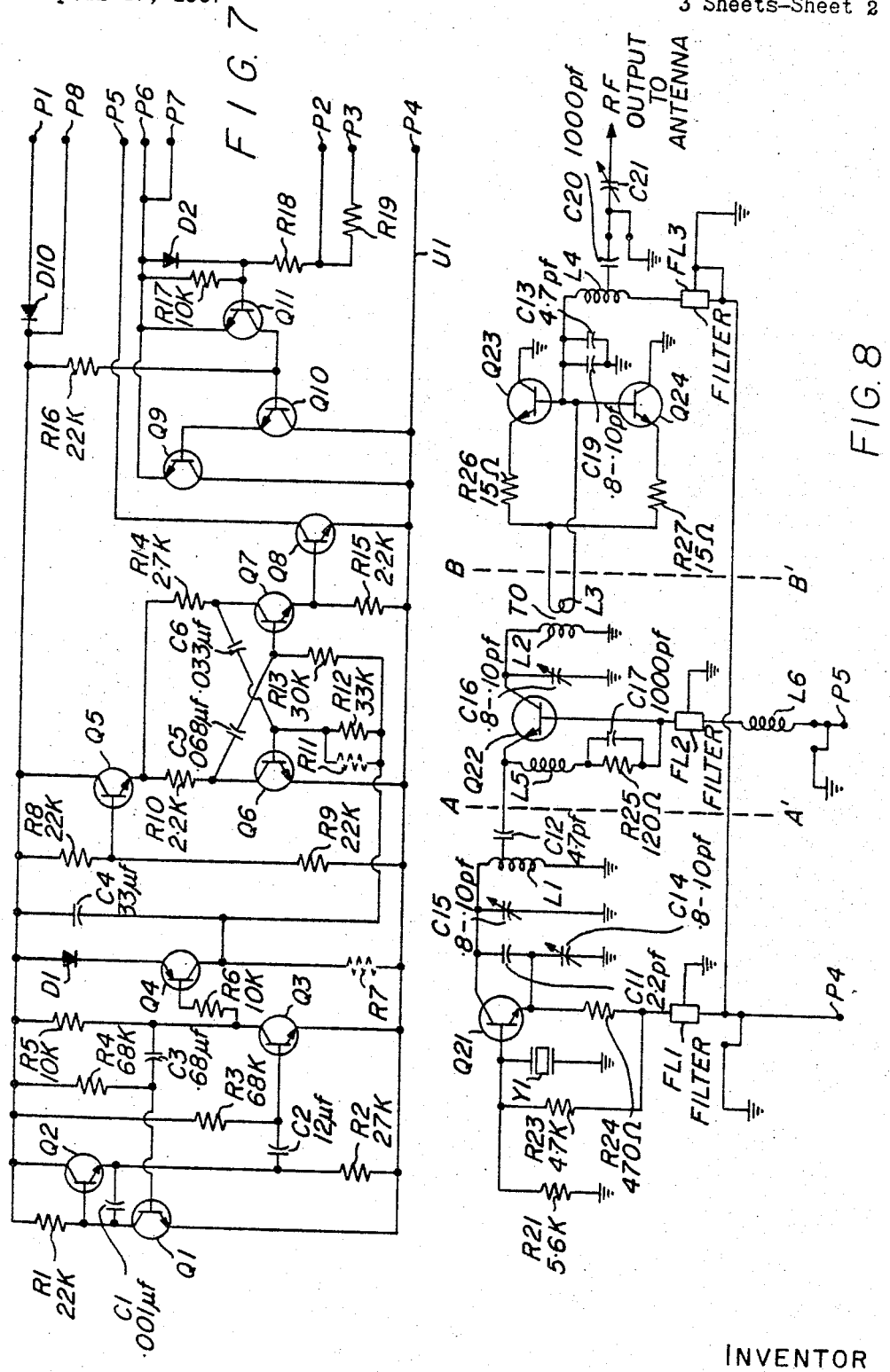

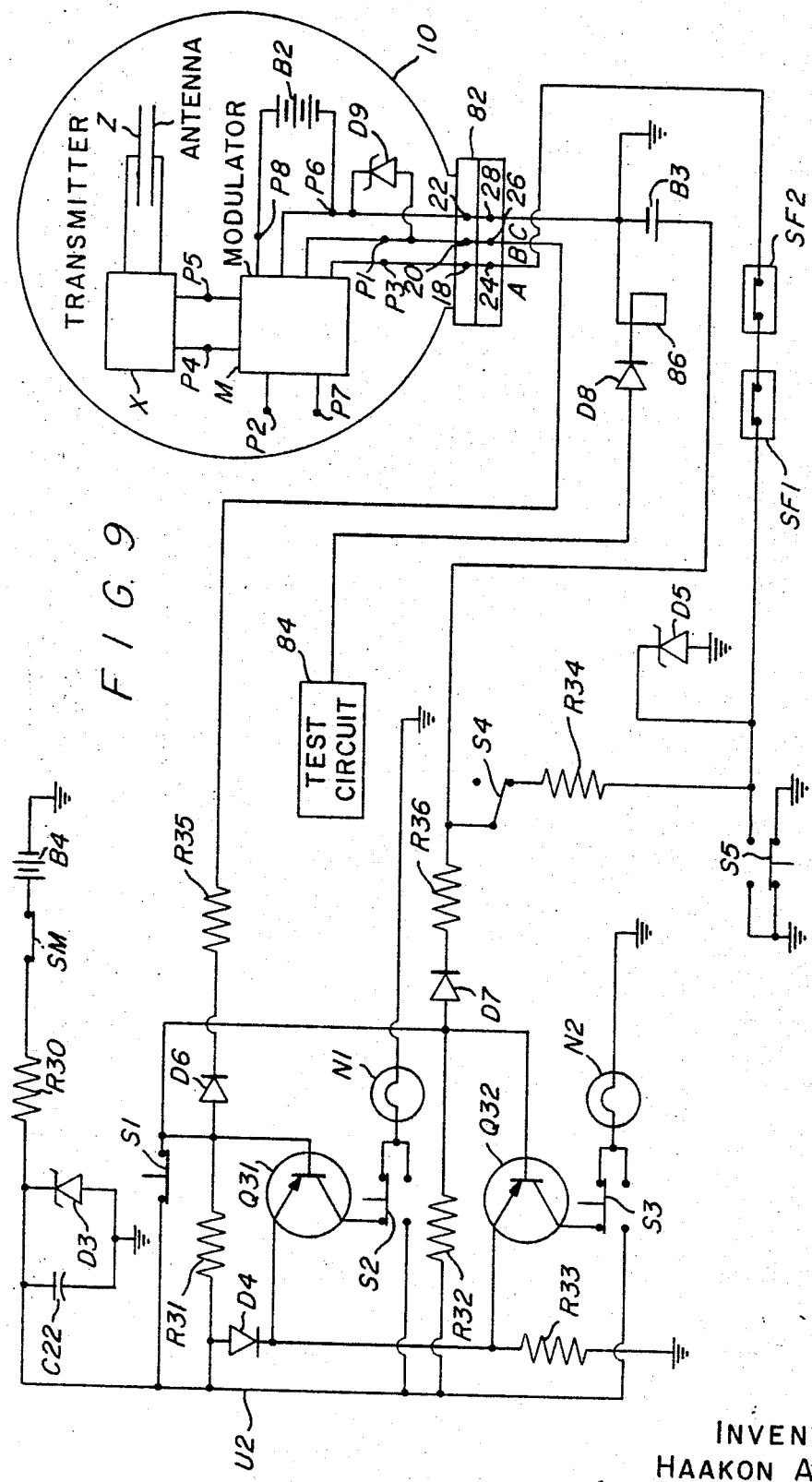

United States Patent Office 3,553,587
Patented Jan. 5, 1971

3,553,587
HELICOPTER CRASH POSITION INDICATOR
Haakon Aass, Manotick, Ontario, Canada, assignor to Leigh Instruments Limited, Ontario, Canada
Filed Apr. 17, 1967, Ser. No. 631,385
Claims priority, application Canada, Mar. 23, 1967, 986,096
Int. Cl. H04b 1/02
U.S. Cl. 325—114                                       9 Claims

ABSTRACT OF THE DISCLOSURE

A helicopter crash position indicator in a biscuit-shaped shock-resistant capsule, releasable from its mounting in response to inertial forces upon impact, having a self-contained radio transmitter rendered operative by release of the capsule from the helicopter, upon impact or by rupture of one or more frangible crash switches upon impact.

BACKGROUND OF THE INVENTION

This invention relates to a crash position indicator, particularly for use in helicopters and similar airborne vehicles.

Crash position indicators per se are known and are described, for example, in U.S. Pat. No. 2,959,671 issued to Harry Stevinson on Nov. 8, 1960, and in the Transactions of the Institute of Radio Engineers on Aeronautical and Navigational Electronics, volume A.N.E.–6 No. 3, September 1959, page 187, in an article entitled "C.P.I.— A Crash Position Indicator for Aircraft," by D. M. Makow and H. T. Stevinson. The crash position indicator described in these publications includes a transmitter encased in a shock-resistant polyfoam casing having flat asymmetric, unstable aerodynamic shape and which, when released from a crashing aircraft as a result of the impact of the aircraft, tends to "tumble" away from the aircraft and to be slowed down to a safer impact velocity by virtue of its aerodynamic shape. The transmitter is rendered operative by means of the interruption of certain holding circuits as a result of ejection of the crash position indicator from the aircraft.

This previously known crash indicator has been found to be unsatisfactory for use in helicopters for a number of reasons. First, the manner of its release from an aircraft is premised on the assumption that an aircraft, just prior to crashing, is travelling forward at an appreciable velocity. Such a premise does not always hold true in the case of the helicopter, which can crash in a variety of different directions, and sometimes with relatively low speed just prior to impact. Second, the aerodynamic shape of the casing described in the aforesaid publications is appropriate in the case of a forward moving and fast moving aircraft so as to "tumble" through the air and slow down to a safe landing speed upon impact of the aircraft, but this aerodynamic shapes does not lend itself to crashing helicopter situations, in which the helicopter may have little or no appreciable velocity, just prior to crash, in any *preassumed* direction. Finally, while aircraft crashes are usually sufficiently severe to eject the crash position indicator, a helicopter may crash from a low altitude with insufficient impact to dislodge the crash position indicator from the helicopter, yet with sufficient impact to render the helicopter inoperative and to injure its crew.

SUMMARY OF THE INVENTION

Accordingly, the present invention provides in or for use with a vehicle such as a helicopter; a self-contained radio transmitter for transmitting a distress signal, a shock resistant capsule housing the transmitter, first switching means for turning on the transmitter in response to release of the capsule from the vehicle, second switching means mounted on the vehicle and responsive to rupture or abnormal shock and turning on the transmitter in response to such rupture or abnormal shock, support means for attachment to the vehicle and for supporting the capsule, and release means associated with said support means for releasably engaging the capsule and releasing the capsule as a result of the inertial force of the capsule against the release means caused by crashing of the vehicle.

As another aspect, the present invention provides for use with a crash position indicator for mounting on a vehicle and having a transmitter encased in a shock-resistant capsule and in which the transmitter is rendered operative as a result of release of the capsule from the vehicle upon crashing of the vehicle carrying the crash position indicator so as to transmit a distress signal, the improvement comprising a support for releasably mounting the capsule on the vehicle and adapted to release the capsule upon downward deceleration greater than some predetermined deceleration.

It is thus seen that a primary provision of the invention is a crash position indicator contained in a shock-resistant capsule mounted for release as a result of impact deceleration, preferably downward deceleration. Secondly, the crash position indicator according to the present invention is rendered operative to transmit a distress signal when a crash occurs even if it is not dislodged from the helicopter. This is made possible by the use of crash-sensitive switches which respond to an unusual jar or rupture in order to render the transmitter operative. Finally, as a further feature, the present invention provides that the outer casing for the crash position indicator be rundle-shaped so as to tend to permit the crash position indicator to roll away from the wreck in the event of a crash. The roll-away feature tends to avoid undue proximity of the crash position indicator to possible explosions of helicopter fuel tanks, armament, or the like.

SUMMARY OF THE DRAWINGS

FIG. 7 is a circuit diagram of an electronic switch and a modulator circuit appropriate for use in the crash position indicator;

FIG. 8 is a circuit diagram of a transmitter circuit suitable for use in the crash position indicator; and FIG. 9 is a circuit diagram showing the connecting circuitry between the vehicle on which the crash position indicator is mounted and the crash position indicator.

DETAILED DESCRIPTION

Figure 1:
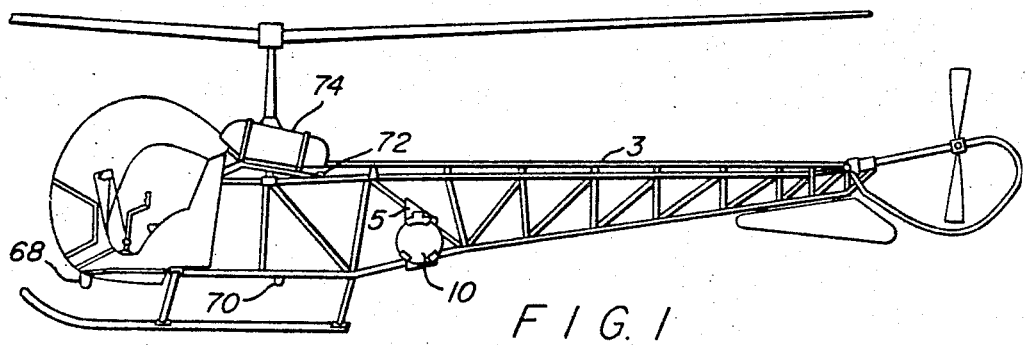
FIG. 1 is a side view of a helicopter showing the crash position indicator mounted thereon.

The crash position indicator according to the invention is intended for use in helicopters and the like. It may also be used in any aircraft which may have a low forward velocity at the time of a crash. However, for brevity only the helicopter installation will be described in detail. In FIG. 1, a helicopter 3 is shown having, at some convenient location, a crash position indicator support 5 fixed to the frame of the helicopter. Mounted on the support 5 is a capsule 10 containing the crash position indicator transmitter, antenna and power supply.

Figure 3:
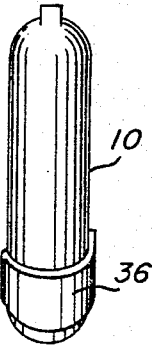
FIG. 3 is a side view of the capsule shown in FIG. 2.

As stated above, the crash position indicator according to the invention is a self-contained radio transmitter having its own internal power supply and encapsulated in an appropriate shock-resistant capsule or container. The materials of which the capsule is made and the manner of mounting the transmitter components within the capsule may be substantially the same as described in U.S. Pat. No. 2,959,671. However, the shape of the capsule is modified, in accordance with the present invention, having regard to the intended use of the container on helicopters and other similar airborne vehicles that may not necessarily have sufficient velocity in any predetermined direction to bring about the tumbling effect made possible by the aerodynamic shape of the capsule for the transmitter described in the aforesaid United States patent. Instead, according to the present invention, the shape of the capsule is preferably as illustrated in FIGS 2 and 3, but may be of any other practical round shape that permits the container to roll.

Figure 2:
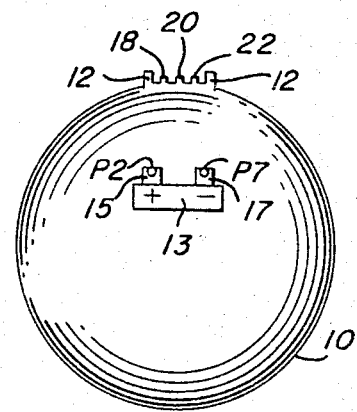
FIG. 2 illustrates the outer capsule housing the crash position indicator.

In FIG. 2, the outer container, 10, of polyurethane foam covered with a reinforcing, protective material such as fiberglass, is shown to be biscuit shaped, with a rounded periphery and flat front and back surfaces. However, the container could be any convenient shape that lends itself to rolling, and the designation "rundle-shaped" will be used to define this property. In general, the container can be more readily mounted on the helicopter if it is not too thick and if it has flat front and back surfaces.

At some convenient location on the exterior of the capsule 10, two terminal posts P2, P7 are provided, spaced apart so as to mate with lugs 15, 17 of a cell 13. Normally the cell 13 is not attached to the posts P2, P7 but when it is desired to remove the crash position indicator from its mounting for inspection the cell 13 is applied as illustrated in FIG. 2, with the result that the small positive voltage on post P2 maintains the transmitter in the OFF mode, as will be explained in more deail below with reference to FIGS. 7 and 8.

Figure 4:
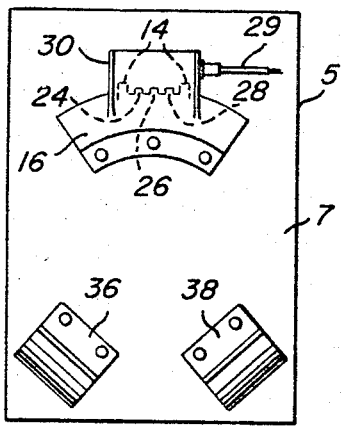
FIG. 4 shows the support for mounting the crash position indicator on an airborne vehicle such as a helicopter.

Referring to FIG. 4, to the base 7 of the support 5 is firmly fixed a bracket 16 for engaging the top portion of the capsule 10. The interior surface of the bracket 16 is curved to fit the periphery of the capsule 10. Also affixed to the mounting plate 5 are a pair of leaf spring mounting brackets 36 and 38. The springs 36 and 38 may be bent downwards by manual pressure to permit the capsule 10 to be engaged by or disengaged from the bracket 16. The capsule 10 is mounted with the protrusions 12 fitting into the mating recesses 14 of the bracket 16. In the absence of the application of force to the springs 36 and 38, these springs tend to force the capsule 10 upward into contact with the bracket 16 and hold the capsule firmly in place. With the protrusions 12 engaged in the recesses 14, the electrical contacts 18, 20 and 22 make contact with the mating electrical contacts 24, 26 and 28 respectively. While these contacts are simply shown as abutting contacts in FIGS. 1 and 3, it is appreciated that the contacts may be pin and socket contacts or any other engaging contacts which provide satisfactory conduction of electrical currents therethrough.

The contacts 24, 26 and 28 lead to connecting wires (not shown), which are enclosed within a cable 29 leading from housing 30 on top of the bracket 16, for connection to circuits within the helicopter or other airborne device on which the crash position indicator is mounted.

The terminals 18, 20 and 22 are connected to the circuits within the housing 10 as will be described in detail below.

The crash position indicator capsule 10 is preferably mounted on the helicopter 3 or other airborne vehicle so that the protrusions 12 point upwards, with the bracket 16 at the top of the three bracket configuration and the brackets 36 and 38 at the bottom of the three bracket configuration. With this configuration, downward movement of the airborne vehicle terminating in an abrupt stop will result in the downward deflection of the clasping brackets 36 and 38 as a result of the inertial force of the capsule 10, thereby to permit the release of the capsule 10, which, because of its shape, can roll away from the helicopter 3. It will be noted that a suitable placing of the leaf spring brackets 36 and 38 will permit release of the capsule 10 if the helicopter crashes in an upright position or if it crashes nose first or tail first. The only direction of crash which will not cause release of the capsule 10 is a more or less up-side-down crash, which is relatively unlikely to occur.

The stiffness of the leaf springs 36 and 38 should be such as to permit release of the capsule 10 upon crashing but the springs should not be so flexible as to permit the release of the capsule 10 during normal vibrations and jarring, and particularly should not permit release of the capsule 10 upon a "hard landing" which is not sufficient to cause damage to the helicopter. It has been found that a deceleration force of about 7 times the force of gravity is a deceleration that occurs rarely during normal operation of the helicopter and which is likely to be exceeded in the event of a crash. Accordingly, the leaf springs 36 and 38 may be designed to permit release of the capsule 10 upon a force in the downward direction of approximately seven times the force of gravity.

The theory of operation of the crash position indicator described herein is that in a reasonably severe crash, the capsule 10 will, by virtue of its inertia, exert sufficient force against the springs 36 and 38 that the capsule 10 will become dislodged, will fall to the ground, and will at least in some cases roll away from the crashed helicopter because of the rundle shape of the capsule. Part of the kinetic energy of the capsule will be spent in forcing the springs 36 and 38 to yield to permit the capsule 10 to be dislodged, which further tends to soften the landing of the capsule when it hits the ground.

Figure 5:
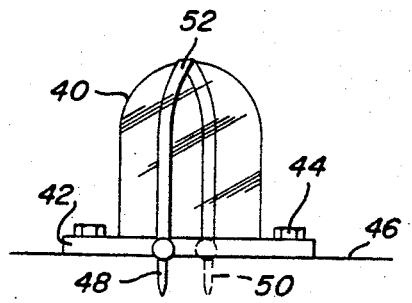
FIG. 5 illustrates a frangible crash switch suitable for use on the helicopter in association with the crash position indicator.

If, however, the capsule 10 does not become dislodged in the event of a crash, but nevertheless the helicopter does not crash with sufficient impact to cause damage to the helicopter, it is a feature of the present invention to provide alternative means for causing the transmitter in the capsule to begin to transmit a distress signal notwithstanding that the capsule is still mounted on the helicopter. To this end, the helicopter is provided at strategic locations with one or more series connected frangible crash switches, two of which are designated in FIG. 9 as SF1 and SF2. These may take, for example, the forms illustrated in FIG. 5 and FIG. 6. FIG. 5 shows a crash switch comprising a breakable glass bulb 40 mounted on a base 42 which may be attached by bolts 44 to the frame 46 of the helicopter. A circuit between two terminals 48 and 50 is completed via a thin metallic film strip 52 which can, for example, be sprayed upon the glass bulb 40. The strip 52 should be sufficiently thin that it will become ruptured when the glass bulb 40 shatters upon impact.

Figure 6:
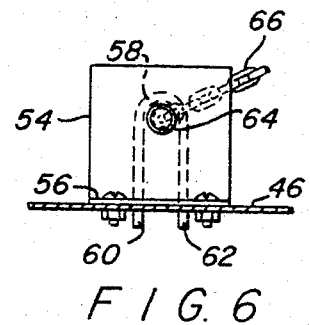
FIG. 6 illustrates a further embodiment of a frangible crash switch appropriate for use with the crash position indicator.

An alternative form of crash switch is shown in FIG. 6. In this case an outer envelope 54, affixed to a base 56 which in turn is fixed to the frame 46 of the helicopter, is composed of glass, cardboard, or any other easily ruptured material. A thin, conductive, easily-frangible wire 58 interconnects two terminals 60, 62. Supported by the outer envelope 54 is a pin 64 (shown in cross-section in FIG. 6) which engages the trough of the U-shaped wire 58. The pin 64 is attached by a chain 66 or other connecting means to a heavy portion of the helicopter, for example to the helicopter motor.

The switches of FIGS. 5 and 6 are intended, upon a crash, to interrupt the circuit connecting the battery B3 to the terminal P3 (FIG. 9). The switch of FIG. 5 is broken when the glass envelope 40 shatters upon impact of the envelope against the ground or against another object into which the helicopter crashes. For this reason, switches of the type shown in FIG. 5 may conveniently be mounted on the extremities of the helicopter (but not on those portions of the helicopter that would make contact with the ground in the event of an ordinary landing). Switches of the type shown in FIG. 6 will conveniently be mounted close to a heavy object to which the connecting chain 66 is attached. The chain should, of course, be mounted sufficiently loosely that ordinary vibration, such as ordinary engine vibration, will not rupture the wire 58.

In the helicopter shown in FIG. 1, for example, crash switches of the type shown in FIG. 5 may be mounted at locations 68 and 70, and a crash switch of the type shown in FIG. 6 might be mounted at location 72 with the connection chain 66 (not shown in FIG. 1) connected to a convenient fixture on the motor 74.

FIG. 7 illustrates the modulator and the electronic switch encompassed within the crash position indicator housing. The electronic switch switches on the modulator and transmitter circuits, when the capsule is released, when the electronic switch is manually rendered operative by a crew member, or when one of the frangible switches is broken. The transistors Q9, Q10 and Q11 are the active elements of the electronic switch. In the OFF mode, a small positive voltage at terminal P2 or terminal P3 will hold the transistor Q11 in conduction. Resistor R19 compensates for the higher voltage at terminal P3; if identical voltages appeared at terminals P2 and P3, the resistor R19 would not be needed. When the transistor Q11 conducts, it biases the transistors Q10 and Q9 (which form a Darlington connection), so that these transistors do not conduct. In the absence of a small positive voltage on the terminal P2 or P3, the transistor Q11 turns OFF and permits the two transistors Q10 and Q9 to conduct. When the transistors Q9 conducts, current can flow from the negative terminal of the crash position indicator battery B2 (see FIG. 9), connected to the terminal P6, through to line U1, from which the transmitter and modulator circuits derive their power.

The diode D10 prevents the positive battery voltage from appearing on the external terminals P2, P7 (see FIGS. 2 and 9). If the positive battery voltage appeared at the external connections, an external current path might be developed (through sea water, for example) which could prevent the transmitter from operating in an emergency.

Turning now to the modulator circuit of FIG. 7, the transistors Q1, Q2 and Q3 are the active devices in an asymmetrical astable multivibrator having a period of about 0.3 second. The transistor Q2 acts in the manner of an emitter follower to recharge the capacitor C2, after discharge, in sufficient time for the following cycle. A positive pulse from the collector of the transistor Q3 causes the transistor Q4 to conduct and discharge capacitor C4. The capacitor C4 then commences to charge exponentially from current conducted via line U1 through the resistor R7. Charging of the capacitor C4 continues until it is once again discharge by the transistor Q4. The approximately saw tooth wave form thus produced is applied to the bases of transistors Q6 and Q7. The resistors R8 and R9 and the transistor Q5 act as a voltage divider.

The transistors Q6 and Q7 are the active elements of a second multivibrator circuit whose frequency varies in proportion to the saw tooth voltage produced by the recurrent charging and discharge of the capacitor C4. The output of the multivibrator is amplified by transistor Q8 and appears at terminal P5, which is connected to the transmitter circuit (see also FIG. 8). The output at terminal P5 is a rectangular wave form having at least a three to one frequency ratio (varying say from 300 to 1000 Hz.), which is used in the transmitter circuit to modulate the frequency doubler stage of the transmitter in excess of 100% (chopped carrier modulation), as will be further discussed with reference to FIG. 8.

FIG. 8 illustrates a transmitter circuit suitable for use in the crash position indicator. It produced a VHF output signal at an emergency frequency of 243 mHz., or could be redesigned to produce some other appropriate output at a frequency in the VHF or UHF range. The radio frequency carrier is modulated by the audio frequency square wave output from the modulator circuit of FIG. 7, which produces a distinctive whooping tone at the receiver.

Power for the transistors Q21, Q23 and Q24 is applied via terminal P4 connected to the line U1 of FIG. 7. The connection is completed through filters FL1 and FL3 of the type sold under trademark Filtercon, each comprising two capacitors and a radio frequency choke, which are used to prevent radio frequency energy from coupling between stages of the transmiter via the common power supply.

The first stage of the transmitter circuit to the left of the broken line AA' is a Colpitts crystal-controlled oscillator, whose active element is the transistor Q21 in common base configuration and capable of operating at a frequency of 121.5 mHz. The oscillator frequency is controlled by a quartz crystal Y1, ground to operate at its fifth overtone at 121.5 mHz. Inductor L1 and capacitor C15 are chosen and adjusted to resonate at this frequency.

The output of the Colpitts oscillator is fed to a frequency doubler stage lying between the broken lines AA' and BB'. The active element of the doubler circuit is the transistor Q22 in common base configuration and operating in class C mode to supply about 70 milliwatts at 243 mHz. to drive the output stage. The doubler stage is over-modulated by the square wave variable audio frequency output of the modulator circuit of FIG. 7, via terminal P5 to give a chopped carrier output. Again a filter FL2 of the same type as the filters FL1 and FL3 and performing the same function is provided between the terminal P5 and the transistor Q22, and an RF choke L6 provides additional RF isolation between the modulator and the transmitter.

The output stage of the transmitter, lying to the right of the broken line BB', is a class C amplifier whose active devices are the transistors Q23 and Q24 in common base configuration. The collectors are grounded to the chassis. The output of the class C amplifier is fed via isolating capacitor C20 to the crash position indicator antenna (not shown). The antenna may be of the parallel plate type described in U.S. Pat. No. 2,959,671. An antenna matching network including capacitors C19, C21, and the tapped coil L4 can be adjusted to match the antenna to the class C amplifier output. The unmodulated power output for the transmitter illustrated is 300 to 400 mw., as measured into a 50 ohm resistive load.

FIG. 9 illustrates the connecting circuitry between the crash position indicator capsule and the helicopter. Inside the capsule 10 are the modulator and electronic switch of FIG. 7 (shown as a single block M) and the transmitter X of FIG. 8. Also shown are the parallel plate antenna Z and the battery B2. The schematic diagram of FIG. 9 is in no way intended to suggest that any of the circuits and components shown within the capsule 10 are located in the particular places in which they happen to appear in FIG. 9. (In fact, the plates of the parallel plate antenna Z will be conveniently arranged to lie parallel to the flat surfaces of the housing 10, and the cells of the battery B2 may lie between the two plates of the antenna Z).

The power supply battery B2 for the transmitter and modulator circuits is connected between terminals P8 and P6 (see also FIG. 7). The battery B2 may be composed of about 12 sealed nickel-cadmium cells. A breakaway connector 82 connects terminals P3, P1 and P6, via lines A, B, and C respectively to the circuits located in the helicopter or other vehicle.

The power supply for the helicopter, shown as a battery B4, provides about 28 volts to line U2 and thence to the remaining circuitry for the crash position indicator through master switch SM, resistor R30, Zener diode D3 (with a breakdown voltage of, say, 30 volts), and capacitor C22, which form a filter circuit, preventing transients from the power supply B4 from affecting the crash position indicator circuit elements.

The battery B2 is charged from line U2 via switch S1, diode D6, current-limiting resistor R35, line B and terminal P1. It will be recalled that diode D10 appears between terminal P1 and the positive terminal of battery B2 (see FIG. 7) in order to prevent a positive voltage from appearing at the external terminals of the crash position indicator.

The battery B3, which supplies the small positive voltage to the terminal P3 of FIG. 7 to maintain the transmitter OFF, is charged from line U2 via switch S1, diode D7 and current-limiting resistor R36. Battery B3 may be composed of say, two nickel-cadmium cells.

Zener diode D9 prevents battery voltage from rising too high when charging occurs at low temperatures. Part of the circuitry of FIG. 9 provides testing means for the charging circuits. When the manually-operable switch S1 (located in the cockpit of the helicopter, for example) is opened, charging current passes through resistor R31 and the base-emitter junction of transistor Q31, turning on the transistor Q31. At the same time, opening of the switch S1 permits charging current to pass through the resistor R32 and the base-emitter junction of the transistor Q32. If charging current is flowing in both charging circuits, the transistors Q31 and Q32 will conduct and panel lights N1 and N2 will light. If charging current is low or absent in either circuit, the corresponding panel light will not be illuminated. Zener diode D5 limits the voltage at terminal P3, to protect the electronic switch circuit. Switches S2 and S3 permit testing of the lamps N1 and N2. Switch S5 is a push button switch which, when depressed, cuts off the positive voltage to terminal P3 and thereby actuates the transmitter for test purposes.

When the transmitter is tested, the RF signal transmitted may be picked up by a monitor loop 86, whose output is rectified by detector diode D8 and transmitted to a test circuit 84. The test circuit 84 may simply be a set of earphones for listening to the audio output.

It can be seen that if the circuit from battery B3 to terminal P3 is broken, by dislodging the capsule from its mounting thereby severing the breakaway connector and disconnecting line A, or by breaking one of the fragible switches SF1, SF2, or by opening the manually-operable switch S4 in the cockpit, the positive voltage will be removed from the terminal P3 and from the base of the transistor Q11 and as a result this transistor Q11 will turn off, permitting the transmitter Q9 to conduct and thereby to energize the transmitter and modulator circuitry. The terminals P2 and P7 are provided to make possible an external shutoff of the radio distress signal by applying a voltage therebetween (see also FIG. 2). This permits the crash position indicator to be turned off when it is removed from its mounting for testing, or when the wreck has been discovered by a search plane, for example, so that the distress signal does not continue until the batteries are dead.

1. In or for use with a vehicle such as a helicopter;
a self-contained radio transmitter for transmitting a distress signal,
a shock resistant capsule housing the transmitter,
first switching means for turning on the transmitter in response to release of the capsule from the vehicle,
second switching means mounted on the vehicle and responsive to rupture or abnormal shock and turning on the transmitter in response to such rupture or abnormal shock,
support means for attachment to the vehicle and for supporting the capsule, and
release means associated with said support means for releasably engaging the capsule and releasing the capsule as a result of the inertial force of the capsule against the release means caused by crashing of the vehicle.

2. Apparatus as defined in claim 1, wherein the capsule is rundle-shaped.

3. Apparatus as defined in claim 2, wherein the capsule has flat front and rear sides and a rounded substantially circular periphery.

4. Apparatus as defined in claim 3, wherein the release means includes leaf springs clasping the underside of the capsule and yielding in response to inertia of the capsule upon sufficient impact of the vehicle thereby to release the capsule.

5. Apparatus as defined in claim 4, additionally including third manually operable switching means accessible to the operator of the vehicle for turning on the transmitter.

6. Apparatus as defined in claim 5 wherein the capsule contains foam plastic in which the transmitter is encapsulated.

7. Apparatus as defined in claim 4, wherein the first and second switching means are connected in a series circuit and wherein the transmitter is turned on when said series circuit is interrupted.

8. Apparatus as defined in claim 7, wherein the second switching means comprises one or more frangible switches connected in series and mounted on the vehicle in locations subject to shock or rupture in the event of a crash.

9. Apparatus as defined in claim 7, wherein the second switching means comprises a plurality of frangible switches each mounted in a location subject to shock or rupture in the event of a crash and each adapted, if the transmitter if off, to turn on the transmitter when broken.

References Cited

UNITED STATES PATENTS

| | | | |
|---|---|---|---|
| 2,519,553 | 8/1950 | Faulkner | 325—114 |
| 3,005,909 | 10/1961 | Graadoff, Jr. | 325—114 |
| 3,335,371 | 8/1967 | Yandell | 325—115 |
| 3,360,728 | 12/1967 | Stevinson et al. | 325—114 |

ROBERT L. GRIFFIN, Primary Examiner
A. J. MAYER, Assistant Examiner